United States Patent
Callahan

(12) 
(10) Patent No.: US 6,948,808 B1
(45) Date of Patent: Sep. 27, 2005

(54) DECORATIVE EYEGLASS LENS, METHOD AND RELATED EYEWEAR

(75) Inventor: Debra L. Callahan, Ormond Beach, FL (US)

(73) Assignee: StyleMark, Inc., Ormond Beach, FL (US)

(*) Notice: Subject to any disclaimer, the term of this patent is extended or adjusted under 35 U.S.C. 154(b) by 0 days.

(21) Appl. No.: 10/673,920

(22) Filed: Sep. 29, 2003

Related U.S. Application Data

(60) Provisional application No. 60/414,678, filed on Sep. 30, 2002.

(51) Int. Cl.[7] ............................................. G02C 11/02
(52) U.S. Cl. ......................................... 351/51; 351/41
(58) Field of Search .............................. 351/41, 51, 52, 351/158

(56) References Cited

U.S. PATENT DOCUMENTS

| | | | | |
|---|---|---|---|---|
| 4,715,702 A | * | 12/1987 | Dillon | 351/44 |
| 4,934,792 A | * | 6/1990 | Tovi | 359/896 |
| 5,013,145 A | * | 5/1991 | Croll | 351/52 |
| 6,114,437 A | * | 9/2000 | Brown et al. | 524/786 |

FOREIGN PATENT DOCUMENTS

| | | | | |
|---|---|---|---|---|
| JP | 52-42129 | * | 4/1977 | 351/51 |

* cited by examiner

*Primary Examiner*—Huy Mai
(74) *Attorney, Agent, or Firm*—Allen, Dyer, Doppelt, Milbrath & Gilchrist, P.A.

(57) ABSTRACT

Decorative glitter is embedded in at least a portion of lens used for eyewear, and is particularly suited for use as sunglasses. The glitter may be dispersed throughout the lens, through only a portion of the lens, or in a decorative pattern or verbal message in the lens. When used with sunglasses, the glitter may be dispersed in side lens associated with the sunglasses.

23 Claims, 5 Drawing Sheets

DECORATIVE EYEGLASS LENS, METHOD AND RELATED EYEWEAR

PRIORITY

Priority is claimed to Provisional Application, Ser. No. 60/414,678, filed on Sep. 30, 2002, which is incorporated here by reference.

BACKGROUND OF THE INVENTION

1. Field of the Invention

The present invention relates to decorative eyeglass lenses and a method for making those lenses, and eyewear using these lenses.

2. Description of the Prior Art

Impact resistant eyeglass lenses are typically made entirely of transparent plastic materials, and are employed in the production and manufacture of eyeglass lenses so that the vision of the user of such lens is not distorted, interrupted or reduced when the lens is worn. Further, impact resistant lenses are used for safety reasons; impact resistant eyeglass lenses are unlikely to crack, break or shatter around the user's eye.

Glitter is made usually of opaque materials and, sometimes, opaque reflective materials. In a typical eyeglass lens, the composition remains constant throughout the lens. Therefore, opaque and opaque reflective materials are lacking.

Glitter has been used to add style and flair among other things to clothing, toys, glue, ink, plastic and acrylic containers such as pencil boxes, and consumer goods such as toothbrushes, watch faces and hairbrushes.

SUMMARY OF THE INVENTION

The present invention is directed to an eyeglass lens design which can be used to provide eye protection and, at the same time, add decorative and unique styling to the user's eyewear. The present invention provides eyeglass wearers with a new, useful, aesthetically pleasing and distinctive eyeglass lens that retains desirable qualitites of entirely transparent eyeglass lenses.

It is an object of the present invention to provide eyeglass wearers with an aesthetic eyeglass lens that creates a single-colored or multicolored flair when worn. In a preferred embodiment of the present invention, this objective is achieved in an eyeglass lens and eyewear having glitter dispersed throughout the lens or dispersed in patterns in or across the lens, and/or disposed in a transparent panel extending along the sides of the eyewear.

One aspect of the invention relates to an eyeglass lens with glitter imparted throughout or along that lens. Preferably, the glitter is dispersed in or across the lens in a manner which will not cause the wearer to experience significant distortion, reduction or interruption in vision; however, it is within the scope of this invention to introduce glitter into the lens in a quantity which may impair sight, if the eyewear is only used when safety is not a concern.

Another aspect of the present invention relates to a method of manufacturing the glittered eyeglass lens and then installing the lens into frames.

In one embodiment of the present invention, the glittered eyeglass lens has a prescribed amount of glitter dispersed throughout the lens. The glitter appears in a random pattern along all surfaces of the lens, as well as the interior of the lens. In another embodiment, glitter is dispensed only along the front or back surface of the lens. This arrangement yields a lens that appears to have similar properties to that in which the glitter is dispersed throughout the lens. In this embodiment, however, the manufacturer controls the final arrangement of the glitter along the surface of the lens.

In yet another embodiment, the lens contains glitter which is dispersed only in or along a peripheral portion of the lens. The lens formed with glitter only appearing around the periphery of the lens leaves the user's visual perception substantially undistorted. The range of glitter in this embodiment may be defined as a distance from the outer edge of the finished lens or the raw, uncut lens.

In another embodiment, glitter is arranged in defined patterns within or along the lens.

In yet another embodiment of the present invention, a one-way mirror layer is fixed to the back surface of the lens. Fixing a one-way mirror layer to the back of the glittered eyeglass lens further enhanced the aesthetic properties of the glitter dispersed throughout or along the lens.

DETAILED DESCRIPTION

Figure 1:
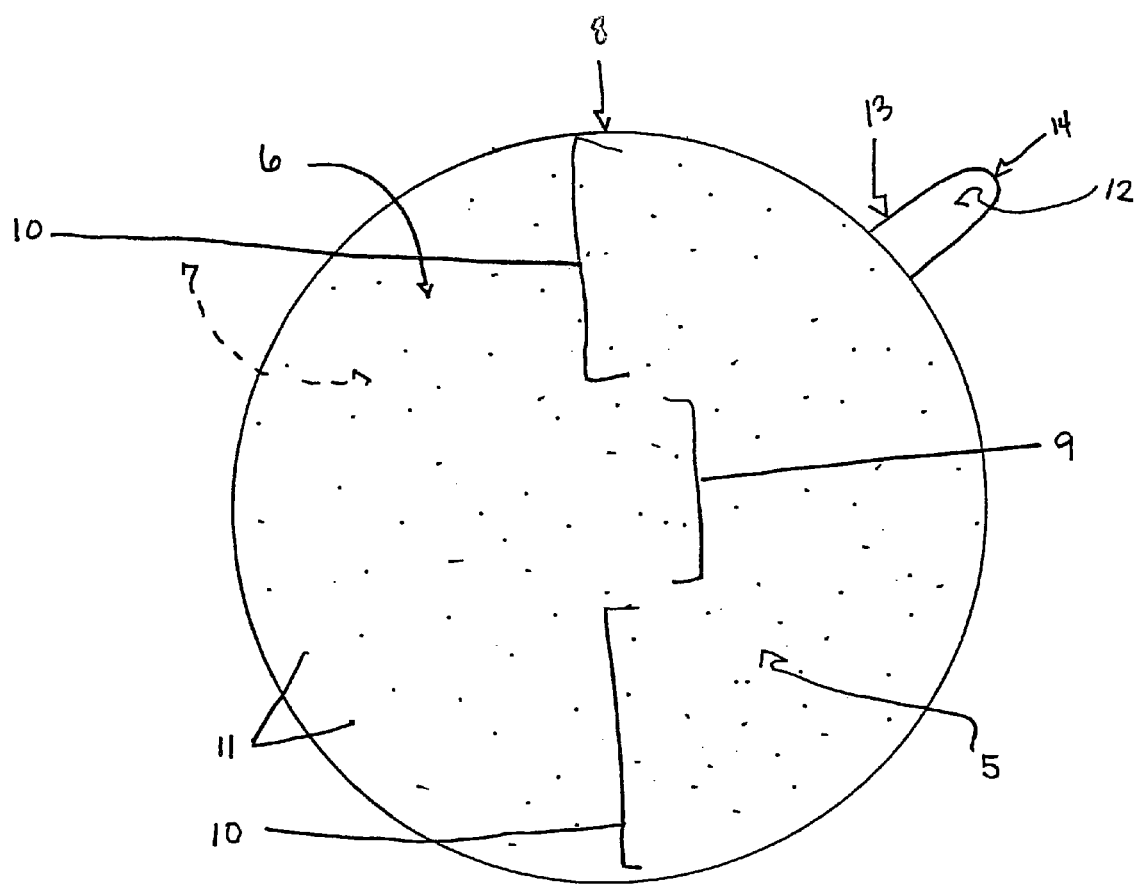
FIG. 1 is a front view of the preferred embodiment of the present invention.

As is described in greater detail below, eyewear lens are embedded with glitter, which is represented in the drawing figures by stippling and may be any color or combination of colors. While it is preferable that the glitter have reflective properties, the glitter may also comprise any opaque material.

Referring to FIG. 1, a plastic eyeglass lens in accordance with the present invention is referred to generally by the reference numeral 5. The uncut eyeglass lens 5 has a front 6 and a back 7 which are formed in a generally elliptical shape. The lens 5 has a peripheral edge 8, a central portion 9 and an intermediate portion 10 between the peripheral edge 8 and the central portion 9. It will of course be understood that the lens 5 is shaped to be later incorporated into eyewear frames. A projection 12 having a proximal attachment to the lens 5 and a distal end 14 provide means for handling the lens 5 during the manufacturing process.

In accordance with the present invention, glitter 11 is dispersed in the lens 5 during the manufacturing process. The particular manner in which the glitter 11 is embedded in the lens 5 is not critical. Suitable methods are described in U.S. Pat. No. 6,013,222 to Douglas et al., U.S. Pat. No. 6,338,558 to Kita and U.S. Pat. No. 6,465,102 to Honigfort, et al., all of which are incorporated here by reference.

As is shown in FIG. 1, the glitter 11 may be dispersed throughout the central and intermediate portions 9, 10, preferably in a density which will not interfere with the eyesight of a person wearing eyeglasses having the glitter dispersed in the lens 5.

Figure 2:
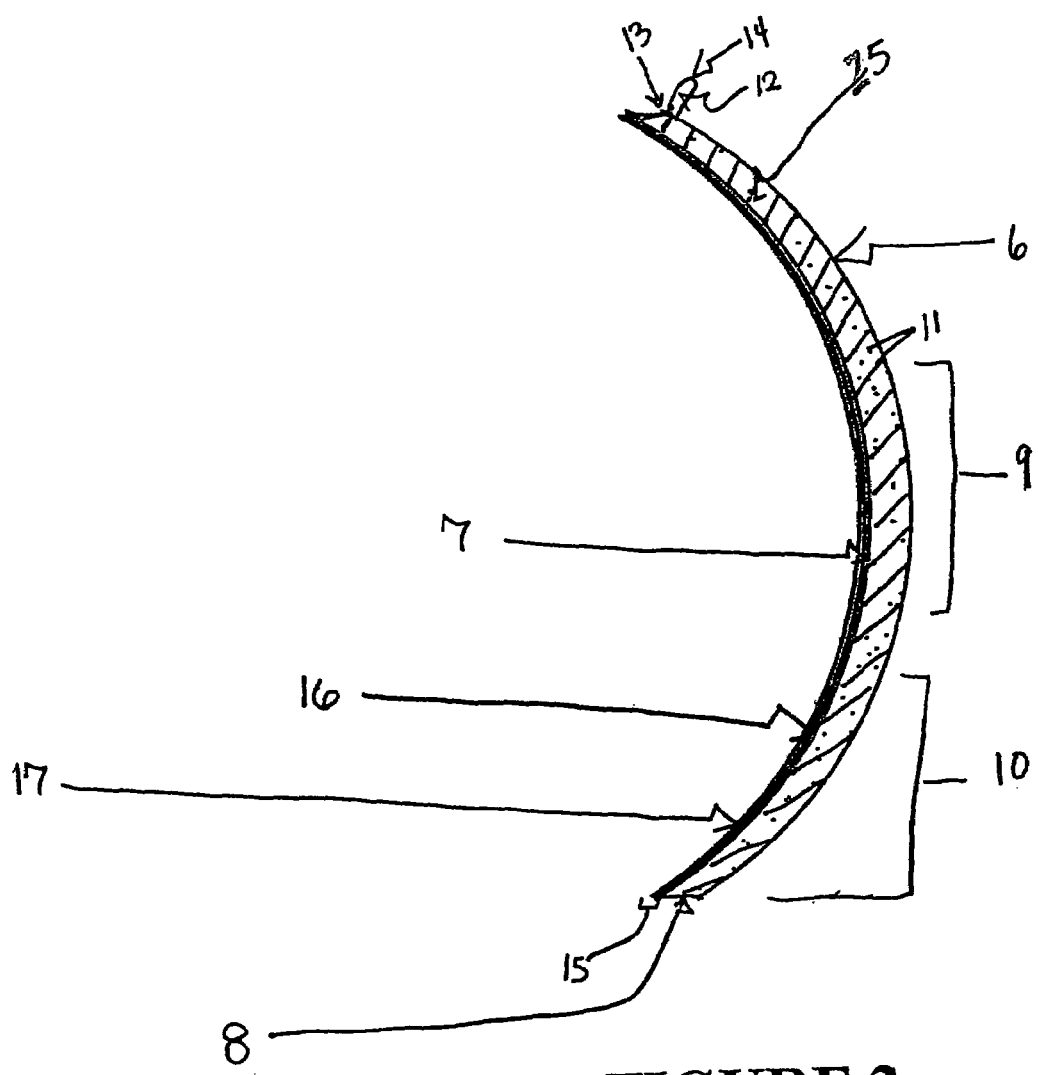
FIG. 2 shows the lens in FIG. 1 with a one-way mirror layer fixed to the back of the lens.

A second embodiment of the present invention is shown in FIG. 2, where a lens 25 is depicted with the same elements as the lens 5 shown in FIG. 1 (that is, a back 6, front 7, peripheral edge 8, central portion 9 and intermediate portion 10). In this embodiment, the lens 25 incorporates a one-way mirror layer 15 on the back 7 of the lens. Glitter 11 is then dispersed either throughout the lens 25, along the front 6, along the back 7, within or along the central portion 9 within or along the intermediate portion 10 or any combination of these.

Figure 3:
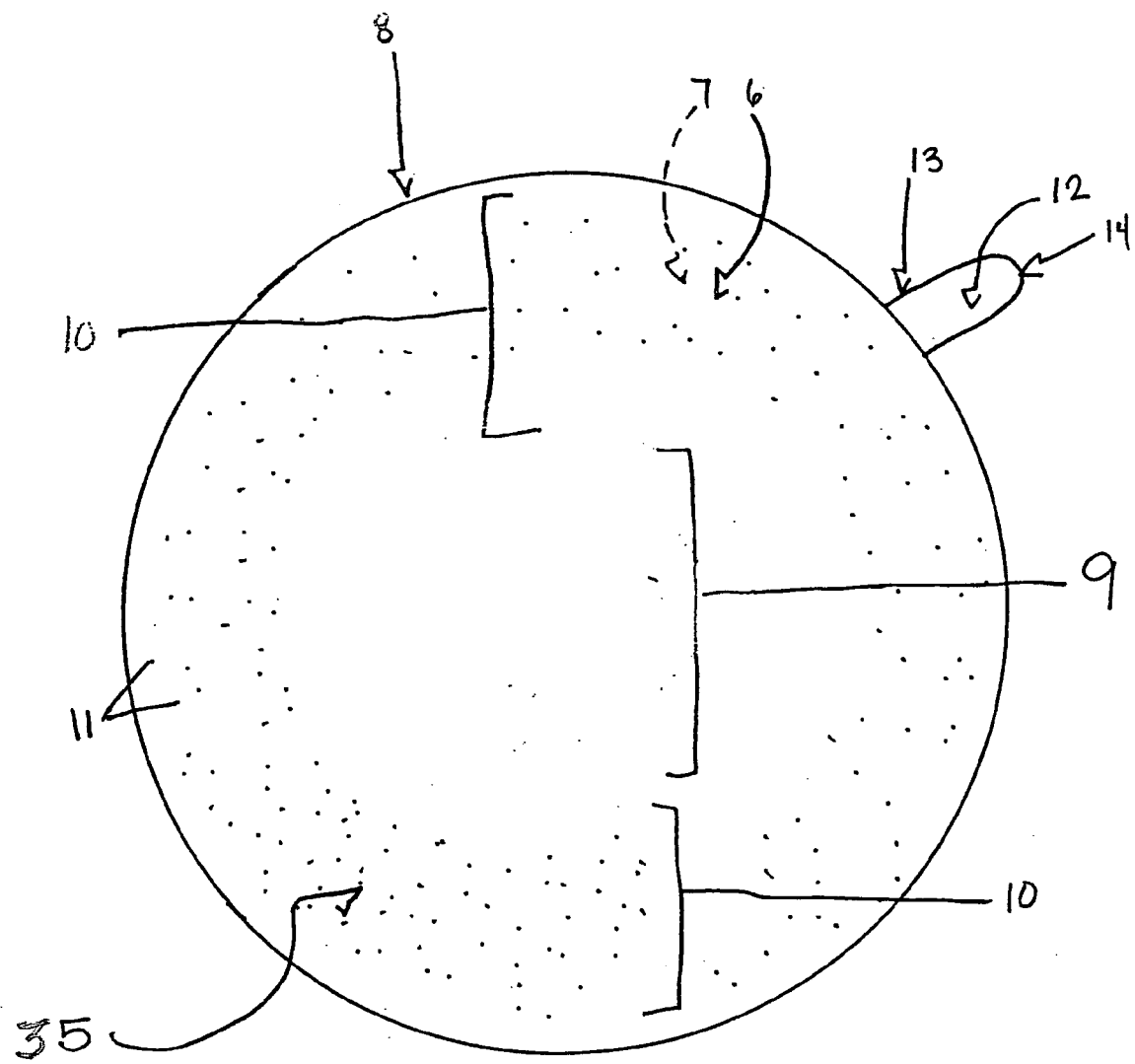
FIG. 3 is a front view of a lens similar to that shown in FIG. 1 with glitter dispersed throughout the outer circumference of the lens only.

A third embodiment of the present invention is shown in FIG. 3, where lens 35 is depicted with the glitter 11 dispersed only within or along the intermediate portion 10 of the lens.

Figure 4:
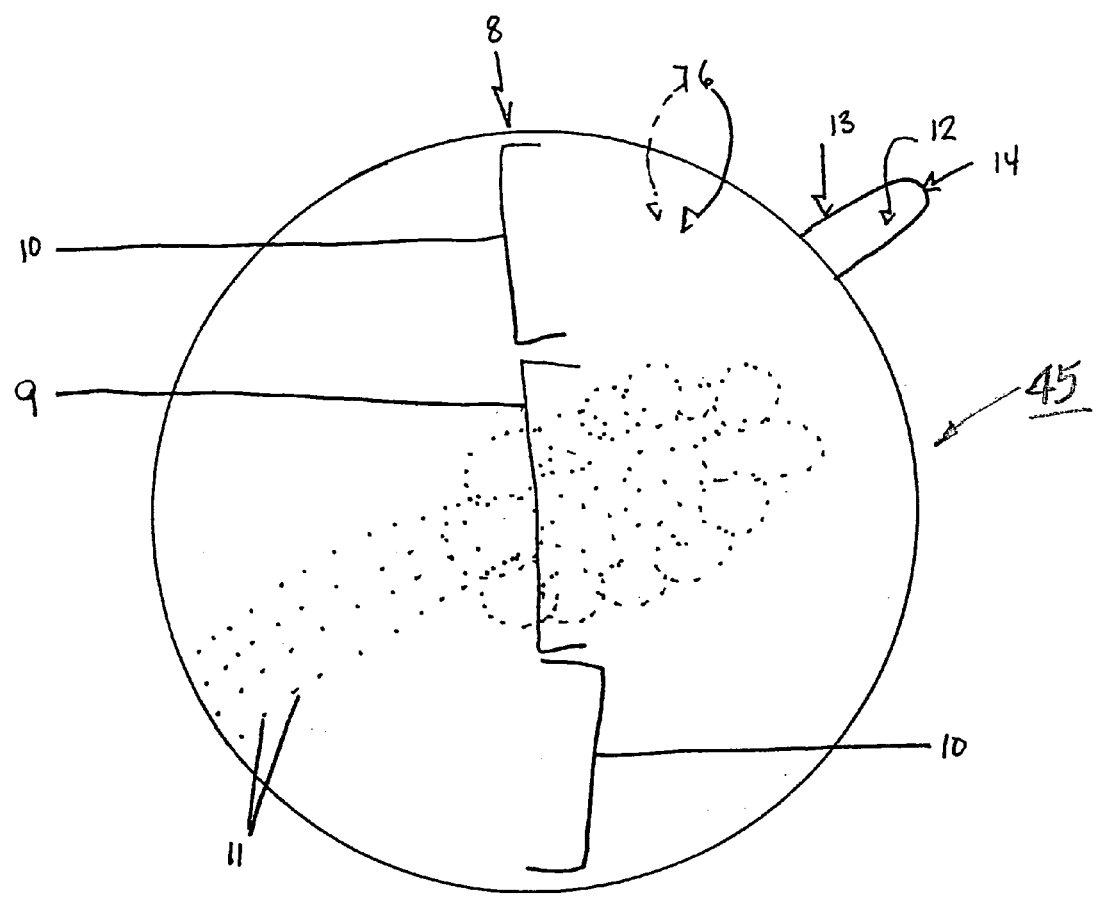
FIG. 4 is a front view of a lens similar to that shown in FIG. 1 with glitter dispersed only in a distinct pattern along the lens.

Yet another embodiment of the present invention is shown in FIG. 4, where lens 45 has glitter 11 dispersed in a decorative pattern extending from the peripheral edge 8 across a part of the intermediate portion 10 and the central portion 9. It will of course be appreciated that the decorative pattern 18 may take any of an unlimited number of forms.

Figure 5:
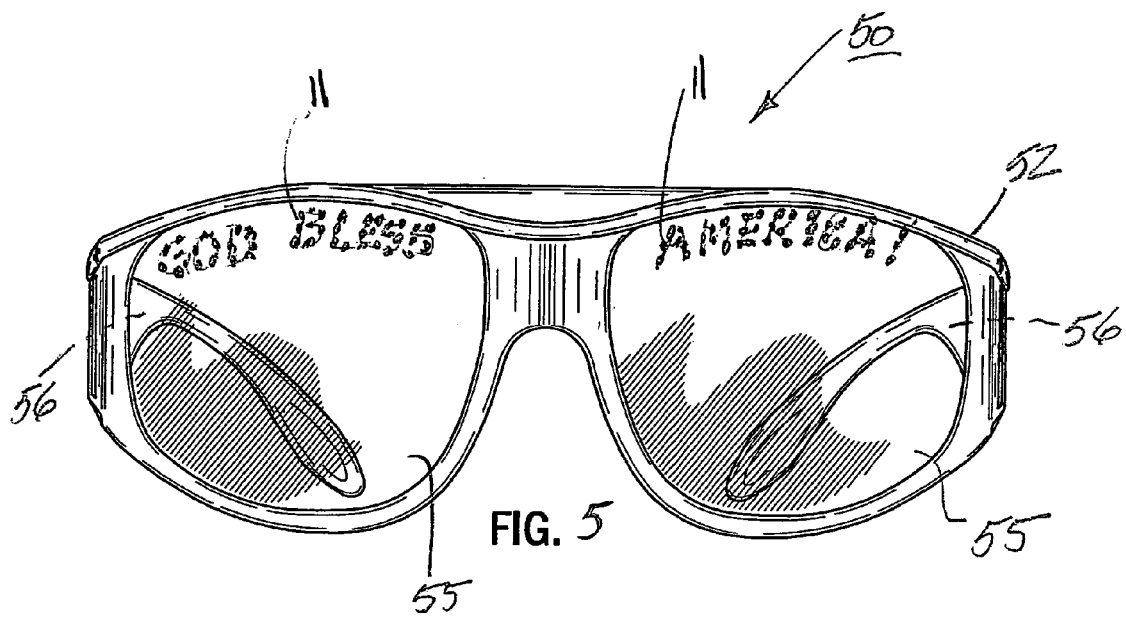
FIGS. 5 and 6 are front and side views, respectively, of eyewear having forward and side lenses using the glitter effect shown in FIGS. 1–4.
Figure 6:
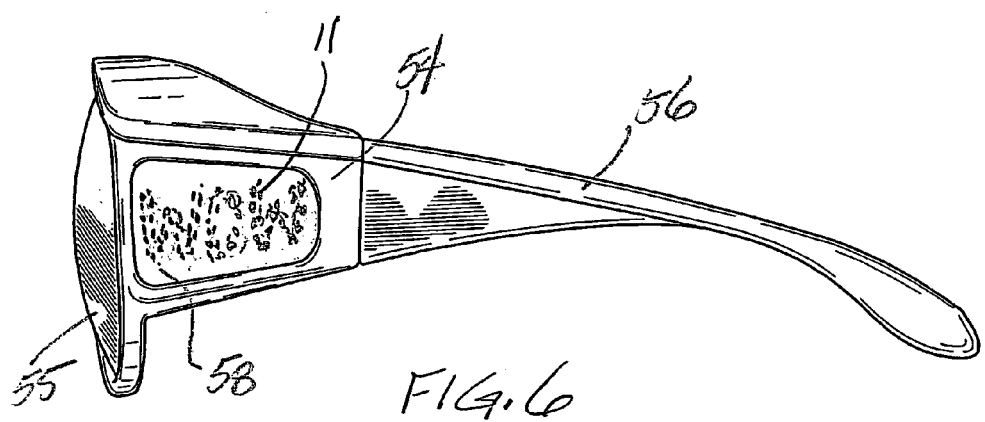

The manner in which the lens 5, 25, 35 and 45 of FIGS. 1–4 are utilized in eyewear will now be described with reference to FIGS. 5 and 6 which illustrate a pair of sunglasses 50 having a lens frame 52 with a pair of lens 55 in accordance with this invention, a pair of side frames 54, each with a side lens 58 and a pair of temples 56. In this embodiment, the lens 55 are tinted to serve as sunglasses. While the lens 55 may have glitter dispersed uniformly through the lens or only in the central portion 9 or intermediate portion 10, in the particular embodiment shown in FIGS. 5 and 6, the glitter is formed as a message across the top of the lens, and are coordinated so that a portion of the message is on one (right) lens and the remaining portion of the message is on the other (left) lens, using glitter 11. A dispersement of glitter 11 either uniformly, proportionally or as a message may be made in the side lens 58 of the side frame 54, even without the use of glitter in the front lens 55.

It will of course be appreciated by those skilled in the art that various modifications may be made in the design of the glittered eyewear described above without departing from the spirit and scope of the present invention. By way of example, the glitter 11 may be applied by a lens using an applique strip fitted to the front 6 or back 7 of the lens.

What is claimed is:

1. A lens for eyewear comprising:
   a plastic lens shaped for use as eyewear; and
   decorative particles embedded in at least a portion of the lens.

2. The lens recited in claim 1 wherein the decorative particles comprise reflective glitter.

3. The lens recited in claim 2 wherein the lens comprises a front, a back, a peripheral edge and a central portion and an intermediate portion between the peripheral edge and the central portion.

4. The lens recited in claim 3 wherein the glitter is dispersed through the central portion and the intermediate portion between the front and back of the lens.

5. The lens recited in claim 3 wherein the glitter is dispersed only in the intermediate portion.

6. The lens recited in claim 3 wherein the glitter is dispersed adjacent the front of the lens.

7. The lens recited in claim 3 wherein the glitter is dispersed adjacent the back of the lens.

8. The lens recited in claim 3 further comprising a one-way mirror along a portion of the back of the lens.

9. The lens recited in claim 3 wherein the glitter is dispersed in a decorative pattern across a portion of the lens.

10. The lens recited in claim 3 wherein the glitter is dispersed in a verbal message across a portion of the lens.

11. Eyewear comprising:
    a lens frame having a pair of lens therein and temples for fitting the lens frame to a user; and
    decorative glitter dispersed in a portion of at least one of the lens.

12. The eyewear recited in claim 11 wherein the lens are tinted for use as sunglasses.

13. The eyewear recited in claim 12 wherein the glitter is dispersed in a decorative pattern in the lens.

14. The eyewear recited in claim 12 wherein the glitter is dispersed in both lens.

15. The eyewear recited in claim 14 wherein the glitter is dispersed in a decorative pattern which continues across both lens.

16. The eyewear recited in claim 12 wherein the frame comprises side panels each having a side lens.

17. The eyewear recited in claim 16 further comprising glitter dispersed in a portion of at least one side lens.

18. Eyewear comprising:
    a lens frame having a pair of front lens therein, and a pair of side panels extending rearwardly with side lens in each panel and temples for fitting the lens frame to a user; and
    decorative glitter dispersed in a portion of at least one of the lens.

19. The eyewear recited in claim 18 wherein the front and side lens are tinted for use as sunglasses.

20. A method for making lens for eyewear, comprising the steps of:
    forming a lens having a generally elliptical shape; and
    dispersing a decorative glitter through at least a portion of the lens.

21. Decorative eyewear, comprising:
    a lens frame;
    a pair of lens mounted in the lens frame, each lens having a front and a back;
    decorative glitter dispersed within at least one of the lens between the front and back thereof; and wherein
    the front and back of the lens containing glitter are free of any overlying glitter-containing film.

22. The decorative eyewear recited in claim 21 wherein the lens containing decorative glitter therein comprises a peripheral edge having a central portion and an intermediate portion between the peripheral edge and the central portion, with the glitter dispersed within the lens only in the intermediate portion.

23. The decorative eyewear recited in claim 21 wherein the glitter is dispersed in a decorative pattern across a portion of the lens containing glitter therein.

* * * * *